Figure 1:
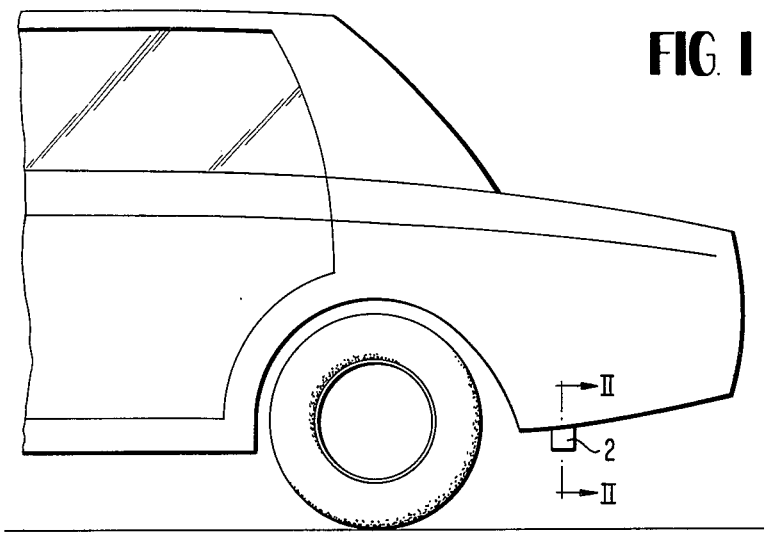

United States Patent

Hack et al.

[11] 4,071,273
[45] Jan. 31, 1978

[54] WATER DISCHARGE, ESPECIALLY FOR HOLLOW SPACES IN MOTOR VEHICLE STRUCTURES

[75] Inventors: Albert Hack, Sindelfingen; Heinz Faix, Boblingen, both of Germany

[73] Assignee: Daimler-Benz Aktiengesellschaft, Germany

[21] Appl. No.: 641,435

[22] Filed: Dec. 17, 1975

[30] Foreign Application Priority Data

Dec. 20, 1974 Germany .............................. 2460428

[51] Int. Cl.² ........................................... B62D 25/00
[52] U.S. Cl. .................. 296/28 R; 137/354; 239/288.5; 296/154
[58] Field of Search ................ 296/28 R, 154, 137 R, 296/37.11, 38; 49/476; 137/354, 355, 351; 52/302; 291/43, 44, 46; 239/288.5; 244/135 R; 180/89.11

[56] References Cited

U.S. PATENT DOCUMENTS

| | | | |
|---|---|---|---|
| 1,734,277 | 11/1929 | Skolnik et al. | 291/46 X |
| 2,033,750 | 3/1936 | Westrope | 296/154 X |
| 2,253,818 | 8/1941 | Simpson | 296/154 X |
| 2,991,120 | 7/1961 | Barenyi | 296/137 R |
| 3,382,889 | 5/1968 | Heinz | 49/476 X |

*Primary Examiner*—Joseph F. Peters, Jr.
*Assistant Examiner*—John A. Pekar
*Attorney, Agent, or Firm*—Craig & Antonelli

[57] ABSTRACT

A water discharge nozzle, especially for hollow spaces in motor vehicle structures, in which the water discharge opening of the nozzle is surrounded on its side facing the atmosphere by an apron whose interior width and whose height amounts to a multiple of the interior width of the water discharge opening.

9 Claims, 2 Drawing Figures

U.S. Patent     Jan. 31, 1978     4,071,273

WATER DISCHARGE, ESPECIALLY FOR HOLLOW SPACES IN MOTOR VEHICLE STRUCTURES

The present invention relates to a water discharge spout or nozzle, especially for hollow spaces in motor vehicle structures.

Water discharge spouts or nozzles are known in the art which are arranged at the respectively lowest places within the areas of the vehicle floor, especially of the luggage space floor or on headlight housings, in order to permit condensation water, water dragged in from the outside or water entering through leaks into the vehicle body to run off or drain so as to thus prevent as much as possible corrosion or water damages in the cargo or in taken along goods, for example, in the luggage space.

Conically shaped spouts or nozzles which were customary heretofore and which were provided with a simple discharge hole, however, did not take into consideration the fact that so much outside water can also enter from the outside at these openings that, for example, cargo or other stored items accommodated at these places may be considerably damaged.

This occurs if in a motor vehicle a high vacuum dependent on the vehicle velocity builds up in the passenger space when opening the sliding roof or a side window, whereby this vacuum continues, for example, up to into the luggage space. Since this vacuum as a rule is higher than the vacuum at the vehicle sub-floor—where for the most part only a relatively slight vacuum is encountered due to build-up of dynamic pressure and turbulences—, it is effected that the dirt water thrown off by the vehicle wheels when driving on a wet street is sucked toward the inside through such a spout or nozzle opening and collects in the respective area as long as the vehicle drives on wet roads with an open sliding roof or window.

The pressure difference between the inside and the outside which is determinative for sucking-in the water may be so considerable at a sufficiently high driving velocity that the water splashes up fountain-like 10 to 20 centimeters from this spout, acts upon a relatively larger area in the spout or nozzle surroundings and thus cannot completely drain off during the stoppage of the vehicle.

The present invention is now concerned with the task to so construct a spout or nozzle that, on the one hand, water collected on the inside—whether due to being dragged in from the outside or due to entering through leaks—can run off safely, yet on the other hand, the penetration of water from the outside through the spout or nozzle is effectively prevented by the utilization of the aerodynamic flow conditions.

The underlying problems are solved according to the present invention in that the water discharge opening of the spout or nozzle is surrounded on its side facing the atmosphere by a circumferential apron whose clear width and whose height respectively amounts to a multiple of the clear width of the water discharge opening.

The ratio of the clear width of the apron to the clear width of the water discharge opening thereby is preferably of the order to magnitude of 6 : 1 and that of the height of the apron to the lower edge of the water discharge opening to the clear width of the water discharge opening is of the order of magnitude of about 4 : 1.

Accordingly, it is an object of the present invention to provide a water discharge nozzle, especially for hollow spaces in motor vehicle structures which avoids by simple means the aforementioned shortcomings and drawbacks encountered in the prior art.

Another object of the present invention resides in a water discharge spout of the type described above which permits a saft drainage of the water that may have reached or collected on the inside of the vehicle structure, yet prevents a sucking-in of water from the outside through the discharge spout.

A further object of the present invention resides in a water discharge nozzle for hollow spaces in motor vehicle structures which effectively minimizes the pressure difference that may exist during the drive of the vehicle between the inside and outside of the discharge opening.

Still a further object of the present invention resides in a water discharge nozzle of the type described above which is simple in constuction, relatively inexpensive to manufacture and extremely effective to prevent the penetration of water from the outside toward the inside through the discharge opening when a lower pressure prevails on the inside of the vehicle.

Figure 2:
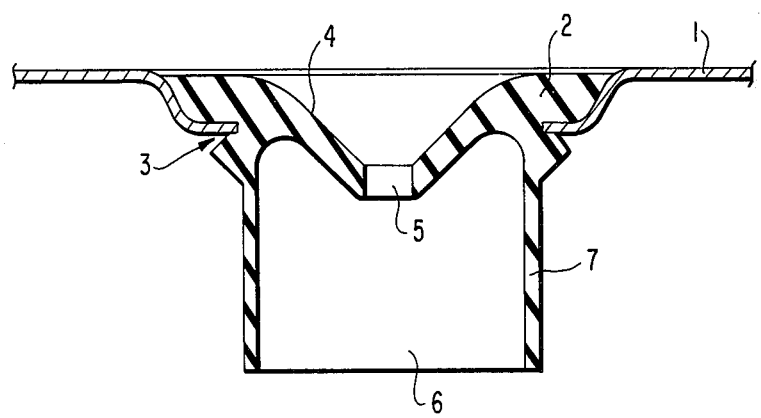

These and other objects, features and advantages of the present invention will become more apparent from the following description when taken in connection with the accompanying drawing which shows, for purposes of illustration only, one embodiment in accordance with the present invention, and wherein:

FIG. 1 is a partial schematic side elevational view illustrating the arrangement of a water discharge spout in accordance with the present invention on a trough of the luggage space floor of a passenger motor vehicle; and FIG. 2 is a cross-sectional view, on an enlarged scale, taken along line II—II of FIG. 1.

Referring now to the drawing wherein like reference numerals are used throughout the two views to designate like parts, a water discharge nozzle or spout 2 is arranged at the lowest place of a recess or trough (not shown in detail) within an opening in the vehicle body panel 1 over a circumferential groove generally designated by reference numeral 3 in such a manner that water which collects in the recess or trough is able to discharge or drain by way of a conically shaped depression 4 through the water discharge opening 5, properly speaking, and through a further larger opening 6 which is surrounded by a circumferential apron 7.

The discharge functions during standstill as well as during the drive as long as a pressure drop exists from the inside toward the outside which is the case with a closed vehicle and with an open ventilating system because the external pressure is slightly negative; a discharge velocity thereby results at the opening 5 which is dependent on the vehicle velocity but is relatively slight.

If now the interior vehicle pressure becomes very much lower than the external pressure due to the opening of the sliding roof or of a side window, then a relatively high suction velocity is produced at the small opening 5 due to this reverse pressure drop which, however, is again far-reachingly decreased by the cross-sectional enlargement within the area of the larger opening 6 surrounded by the apron 7. Whereas the opening 5 is dimensioned according to the water yield to be expected and to be experimentally determined and normally has a diameter of about 4 to 5 mm., the other dimensions of the water discharge spout or nozzle 2 are determined experimentally in wind tunnel tests.

The cross section of the opening 6 has to be thereby so dimensioned that with the maximum possible vacuum in the passenger space, which results with an open sliding roof and with a closed ventilating system, such a low velocity results within the lower area of the opening 6 up to a vehicle velocity of 150 km/h that no splash water is torn up through the opening 6. Cross-sectional ratios for the openings 6 and 5 of about 6 : 1 result therefrom.

The distance between the discharge areas of the openings 5 and 6 is obtained, taking into consideration the entire nozzle or spout length which is determined by the clearance slope angle of a vehicle—also from tests in the wind tunnel. This distance must be so large that the high suction velocity at the opening 5 leads to a more or less uniform velocity profile in the lower area of the opening 6. A ratio of about 4 : 1 is necessary therefor.

The wall thickness and the material of the nozzle or spout—which may be of rubber or synthetic plastic material—will result from the requirements that the spout or nozzle is not deformed by the aerodynamic wind and the impinging splash water.

In addition to the described embodiment, for example, also specially made spouts or nozzles for the water discharge holes at the vehicle doors may be provided, which are intended to permit the drainage of water entering through window shafts, and which may also lead under the described conditions with vacuum in the passenger space—which in this case extends into the interior of the door—to the fact that no water is sucked in from the outside.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A water discharge nozzle characterized by a nozzle means provided with a discharge opening which is surrounded on its side facing the atmosphere by a circumferential apron means, the clear width and height of the apron means amounting to a multiple of the clear width of the water discharge opening, and characterized in that the ratio of the interior width of the apron means to the interior width of the water discharge opening is of the order of magnitude of about 6 : 1.

2. A water discharge nozzle according to claim 1, characterized in that the ratio of the height of the apron means to the interior width of the water discharge opening is of the order of magnitude of about 4 : 1.

3. A water discharge nozzle characterized by a nozzle means provided with a discharge opening which is surrounded on its side facing the atmosphere by a circumferential apron means, the clear width and height of the apron means amounting to a multiple of the clear width of the water discharge opening, and characterized in that the ratio of the height of the apron means to the interior width of the water discharge opening is of the order of magnitude of about 4 : 1.

4. A water discharge nozzle for hollow spaces of vehicle structures, the improvement comprising means for preventing penetration of water from the exterior of the nozzle through the discharge opening of the nozzle, wherein said means for preventing penetration of water minimizes pressure differences between the interior and the exterior of the nozzle during operation of the vehicle, wherein said means for preventing penetration of water includes an apron surrounding the outlet end of said nozzle, said apron having a height dimension and an opening dimension which are multiples of the discharge opening dimension of the nozzle, and wherein the ratio of the apron opening dimension to the discharge opening dimension is of the order of 6 : 1.

5. A water discharge nozzle according to claim 4, wherein the ratio of the apron height dimension to the discharge opening dimension is of the order of 4 : 1.

6. A water discharge nozzle for hollow spaces of vehicle structures, the improvement comprising means for preventing penetration of water from the exterior of the nozzle through the discharge opening of the nozzle, wherein said means for preventing penetration of water minimizes pressure differences between the interior and the exterior of the nozzle during operation of the vehicle, wherein said means for preventing penetration of water includes an apron surrounding the outlet end of said nozzle, said apron having a height dimension and an opening dimension which are multiples of the discharge opening dimension of the nozzle, and wherein the ratio of the apron height dimension to the discharge opening dimension is of the order of 4 : 1.

7. A water discharge nozzle for hollow spaces of vehicle structures, the improvement comprising means for preventing penetration of water from the exterior of the nozzle through the discharge opening of the nozzle, wherein said means for preventing penetration of water minimizes pressure differences between the interior and the exterior of the nozzle during the operation of the vehicle, wherein said means for preventing penetration of water includes an apron surrounding the outlet end of said nozzle, said apron having a height dimension and an opening dimension which are multiples of the discharge opening dimension of the nozzle, wherein said nozzle and said apron are constructed into a unitary structure, and wherein said unitary structure includes a conically shaped depression having said discharge opening at the conical vertex, thereby forming the outlet end of said nozzle, and a hollow cylindrically-shaped extension surrounding said discharge opening, thereby forming said apron.

8. A water discharge nozzle according to claim 7, wherein said unitary structure is mounted in an opening at the lowest portion of said hollow spaces.

9. In a water discharge nozzle for hollow spaces of vehicle structures, the improvement comprising means for preventing penetration of water from the exterior of the nozzle through the discharge opening of the nozzle, said means including a unitary structure of said nozzle and an apron surrounding said nozzle and extending below the discharge opening, wherein said unitary structure comprises a conically shaped depression having said discharge opening at the conical vertex, thereby forming the outlet of said nozzle, and a hollow cylindrically-shaped extension surrounding said discharge opening, thereby forming said apron.

* * * * *